United States Patent [19]

Dreibelbis et al.

[11] Patent Number: 4,844,149
[45] Date of Patent: Jul. 4, 1989

[54] WARM-UP/CHANGEOVER VALVE OR PROXIMITY SWITCH

[75] Inventors: Richard C. Dreibelbis, Fair Lawn, N.J.; Milton H. Coleman, Syracuse, N.Y.

[73] Assignee: Carrier Corporation, Syracuse, N.Y.

[21] Appl. No.: 125,897

[22] Filed: Nov. 27, 1987

Related U.S. Application Data

[62] Division of Ser. No. 816,187, Jan. 6, 1986.

[51] Int. Cl.$^4$ .......................... F24F 3/00; F24F 11/04
[52] U.S. Cl. ........................................ 165/22; 165/24; 236/1 C; 236/49.3; 236/48 A; 236/86; 251/65
[58] Field of Search ............... 236/49, 86, 48 A, 1 C, 236/1 B; 165/22, 25, 24; 251/65

[56] References Cited

U.S. PATENT DOCUMENTS

| | | | |
|---|---|---|---|
| 1,729,060 | 9/1929 | Breese, Jr. | 236/48 X |
| 2,575,086 | 11/1951 | Atchison | 236/48 A |
| 2,781,979 | 2/1957 | Kraft | 236/48 A |
| 4,073,433 | 2/1978 | Modes | 236/49 |
| 4,298,164 | 11/1981 | Post | 236/49 |

OTHER PUBLICATIONS

Abell, W. A. and Shakib, I. D., "Magnetically Actuated Pneumatic Valve", IBM Technical Disclosure, vol. 12, No. 12, May 1970, p. 2302.

Carrier, Installation and Start-Up Instructions 37P, Moduline Weathermaster Air Terminals, 1973, Form 37P-5SI.

Primary Examiner—Albert W. Davis, Jr.
Assistant Examiner—John K. Ford
Attorney, Agent, or Firm—David J. Zobkiw

[57] ABSTRACT

A valve is provided with one inlet and two outlets with one of the outlets being normally closed by a valve in the form of a film disc carried by a flexible blade. A magnetic pad secured to the blade is attracted by the proximity of an actuator carrier magnetic element to cause the flexing of the blade to open the normally closed outlet and to close the normally open outlet. The actuator may be either thermally or electrically actuated and is suitable for use in a VAV system with thermostatically controlled bellows to override a bleed thermostat to permit warm-up of an overcooled area or to cause a switch over in operation between a heating and cooling mode by connecting the appropriate bleed thermostat so as to control the inflation of the bellows.

6 Claims, 6 Drawing Sheets

WARM-UP/CHANGEOVER VALVE OR PROXIMITY SWITCH

This application is a division of application Ser. No. 816,187 filed Jan. 6, 1986.

BACKGROUND OF THE INVENTION

In central air conditioning systems where conditioned air is supplied at a single temperature, it is often necessary and/or desirable to change over from heating to cooling and vice versa. Such changeovers can be long-term, as in the case of seasonal changes or short-term, as in the case of warming up an overcooled building prior to the arrival of the work force. For example, after a weekend or holiday during which the minimum cooling condition overcooled the building in the absence of the cooling load supplied by the personnel, lights and equipment, it is desirable to warm the building long enough to reduce the overcooling to an acceptable level. The thermostatic response is, however, correct without change for only one mode of operation. If, for example, the thermostatic response is correct for cooling, the supplying of heated air will encounter a minimum or no flow condition in an undercooled zone or area and dissatisfaction causing overheating if the zone temperature is above the cooling set point. Obviously, neither condition is satisfactory or energy efficient.

SUMMARY OF THE INVENTION

The present invention is directed to a warm-up/changeover valve or proximity switch suitable for use in a system powered device in which air flow into a zone is controlled by the degree of bellows inflation which is in turn controlled by a thermostatic bleed valve. The warm-up/changeover valve or proximity switch can be either thermostatically responsive or solenoid actuated. If the use is to be for warm-up, a bleed line for deflating the bellows is opened when the valve is opened in response to the supplying of warm air or to the ceasing of the supplying of electrical power to the solenoid as due to the opening of a thermostatic switch. If a changeover function is required, the valve is configured as a valve with one outlet supplying air to the heating thermostat and one outlet supplying air to the cooling thermostat.

It is, therefore, an object of this invention to provide a thermostatically responsive valve or proximity switch for achieving a warm-up or changeover function in a conditioned air distributing system.

It is another object of this invention to provide an uncontrolled warm-up function in which a valve bypasses a cooling only, duct powered thermostat bleeding an inflatable bellows in a normally open unit when warm air reaches the sensing element controlling the valve in one embodiment and in response to an electric signal in another embodiment.

It is a further object of this invention to provide a switchover of control air pressure to either side of a two port, heating/cooling duct powered thermostat in response to a change in the duct temperature in one embodiment and in response to an electric signal in a second embodiment.

It is an additional object of this invention to provide a thermostat bypass or shutoff of a duct powered control in response to an external electric signal as from a fire switch or interlock. These objects, and others as will become apparent hereinafter, are provided according to the teachings of the present invention.

Basically, a valve or proximity switch assembly is provided with an inlet, a normally open outlet and a normally closed outlet. A valve element is movable between two positions respectively blocking one of the two outlets. The movement of the valve element to the position closing the normally open outlet, and thereby opening the normally closed outlet, is responsive to the movement of a magnetic member into sufficient proximity to cause the valve element to snap over from one position to the other. The magnetic member is carried by an actuator which is moved in one embodiment responsive to a change in the temperature of the conditioned air being supplied and in another embodiment responsive to an electrical signal.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
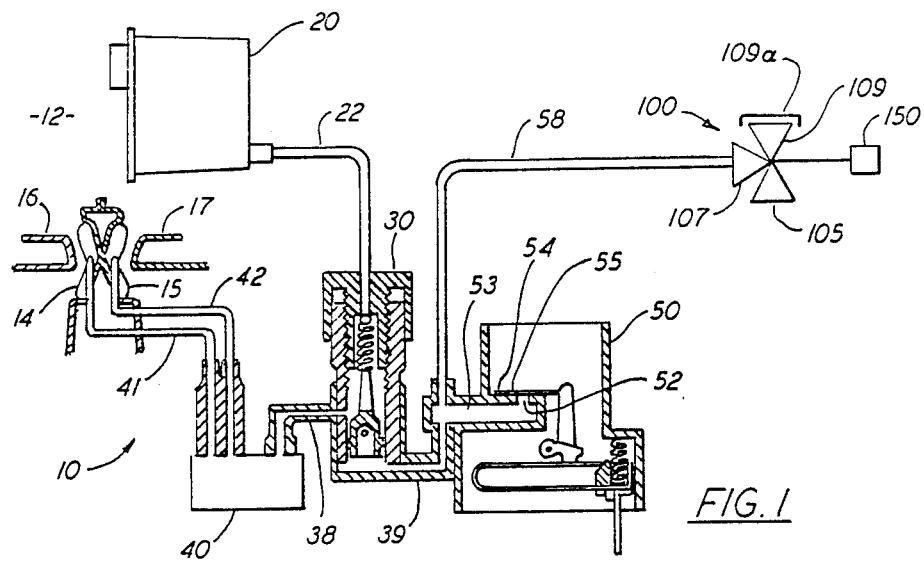
FIG. 1 is a schematic representation of a central air conditioning system employing the present invention for a warm-up function.

FIG. 1 illustrates the use of the present invention in a warm-up configuration and is suitable for use with either actuator 150, 250 or 350 which will be described in more detail hereinafter. The numeral 10 generally designates an air distribution unit in which conditioned air is delivered from a central source thereof (not illustrated) to a plenum chamber 12 of the air distribution unit. A damper arrangement illustrated as inflatable bellows 14 and 15 regulates the flow of conditioned air from the plenum 12 to the area or space being conditioned. A portion of the conditioned air furnished to plenum chamber 12 flows through filter 20 where any foreign bodies entrained therein will be removed. The conditioned air passing through filter 20 is used for controlling the operation of unit 10. The control air passes from filter 20 to pressure regulator 30 via line 22. The control air passes from regulator 30 into distributor 40 via line 38 and from distributor 40 via lines 41 and 42 to bellows 14 and 15, respectively. Additionally, control air passes via line 39 to bleed-type thermostat 50 which senses the temperature of the area to be conditioned and in response thereto controls the magnitude of the control signal supplied to bellows 14 and 15 by bleeding control air through bleed port 52 and the aperture 55 of apertured sliding plate 54. The common or inlet port 107 of valve assembly 100 is connected upstream of bleed port 52 via line 58. Normally open outlet 109 is capped by a cap 109a so that line 58 is normally blocked and has no influence on thermostat 50. Assuming that thermostat 50 is set for cooling an area, the slide plate 54 and therefore the inflation of bellows 14 and 15 will be adjusted accordingly. If, as described above, an overcooling situation exists in the area and it is desired to have an uncontrolled warm-up, the mere supplying of warm air would not cause flow of warm air into the area because the response of thermostat 50 to the overcooling is to inflate bellows 14 and 15 to block flow into the area. Actuator 150, as illustrated, actuator 250, or thermostatic switch 180 of actuator 350 is exposed to the warm air in the plenum or the flowing air stream which causes the actuation of actuator 150 (or actuator 250, or the deactuation of actuator 350) which causes the flexure of blade 122 to the FIG. 4 position due to the magnetic attraction between magnetic member 165 and magnetic pad 128. In this position, port 104 is uncovered so that bellows 14 and 15 are connected to atmosphere via lines 41 and 42, distributor 40, line 38, line 39, line 58 and outlet 105 which effectively bypasses/disables thermostat 50 such that bellows 14 and 15 deflate and warm air is delivered to the area independent of thermostat 50.

Figure 2:
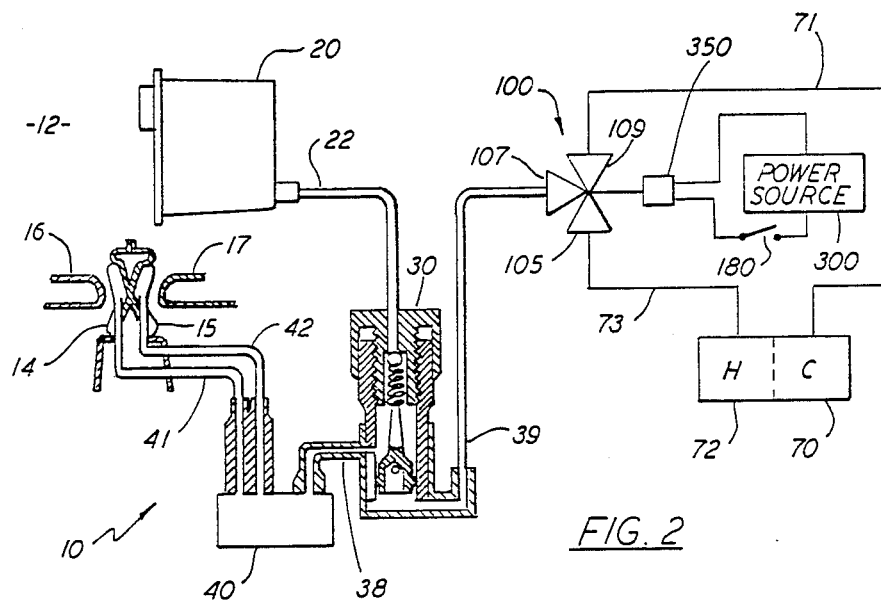
FIG. 2 is a schematic representation of a central air conditioning system employing the present invention for a heating/cooling changeover.

FIG. 2 illustrates the use of the present invention in a cooling/heating changeover configuration and is suitable for use with actuator 150, 250 or 350. The numeral 10 generally designates an air distribution unit as described with respect to FIG. 1 in which conditioned air flows through filter 20 to pressure regulator 30 via line 22 and passes from regulator 30 into distributor 40 via line 38. The air passes from distributor 40 via lines 41 and 42 to bellows 14 and 15, respectively. Additionally, control air passes via line 39 to common or inlet port 107 of valve assembly 100. Normally open outlet 109 is connected to cooling thermostat 70 via line 71 and normally closed outlet 105 is connected to heating thermostat 72 via line 73. Thermostats 70 and 72 are oppositely acting bleed thermostats such as is illustrated in FIG. 1 and designated 50. They are oppositely acting in that cooling thermostat 70 controls the lowering of the room temperature to the set point whereas heating thermostat 72 controls the raising of the room temperature to the set point.

The actuator 350, as illustrated, may have a switch 180 which may be of a thermostatic type and exposed to the plenum air or flowing air stream, or it may be a switch controlled by a computer or the like. The actuated and unactuated position of actuator 350 are the reverse of those of actuators 150 and 250. In the actuated position of actuator 350, control air passes via line 39 to port 107, through valve assembly 100, out port 109 and passes via line 71 to cooling thermostat 70 which controls the inflation of bellows 14 and 15 as described above. If actuator 350 is unactuated, control air will pass via line 39 to port 107, through valve assembly 100, out port 105 and will pass via line 73 to heating thermostat 72 which controls the inflation of bellows 14 and 15 as described above. Actuator 150 or 250 would similarly respond to the plenum air or flowing air stream so as to connect ports 107 and 109 in response to cool air and ports 107 and 105 in response to hot air but the designation of the actuated and unactuated positions would be reversed. If desired, the ports 109 and 105 could be connected to thermostats 72 and 70, respectively, if the heating mode was desired to be the actuated mode of actuator 350 or the unactuated mode of actuator 150 or 250. Where switch 180 is computer controlled, in addition to providing a changeover between heating and cooling, ventilation can be minimized in the case of a fire by causing the system to go over to the heating mode which would reduce the supplying of fresh air to the fire. Additionally, where valve assembly 100 is connected as shown in FIG. 1 and powered by actuator 350, an electric signal actuating actuator 350 will open port 105 to cause the bypassing of thermostat 50 and the deflating of bellows 14 and 15 providing maximum air circulation which is desired on the building floors above and below a fire. As noted, on the fire floor itself port 105 remains closed and the raised space temperature will cause the bellows 14 and 15 to inflate due to the stopping of bleed flow from thermostat 50 and thereby stop the flow if air to the space.

Figure 3:
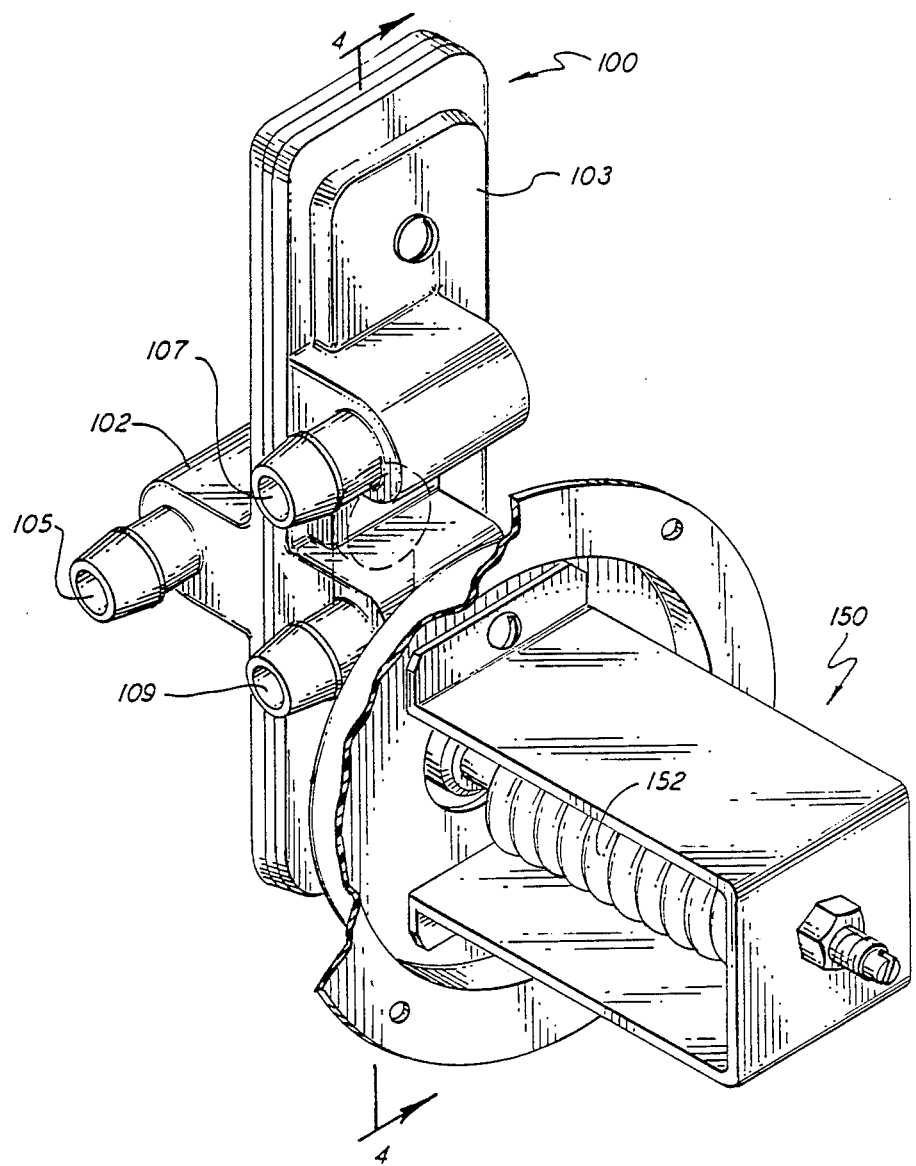
FIG. 3 is a pictorial view of a first embodiment of the present invention.
Figure 4:
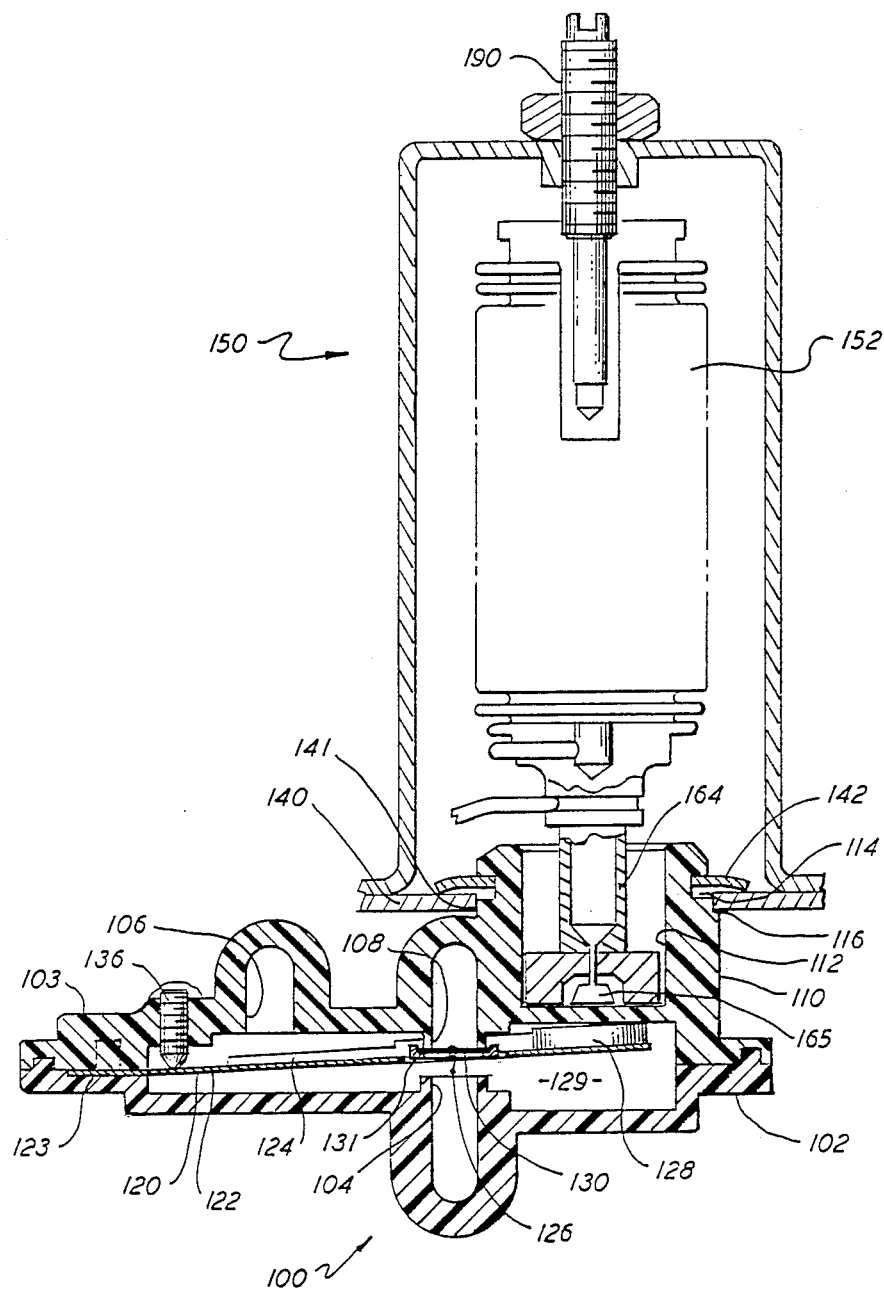
FIG. 4 is a sectional view taken along line 4—4 of FIG. 3 showing the valve element in a first, actuated position.
Figure 5:
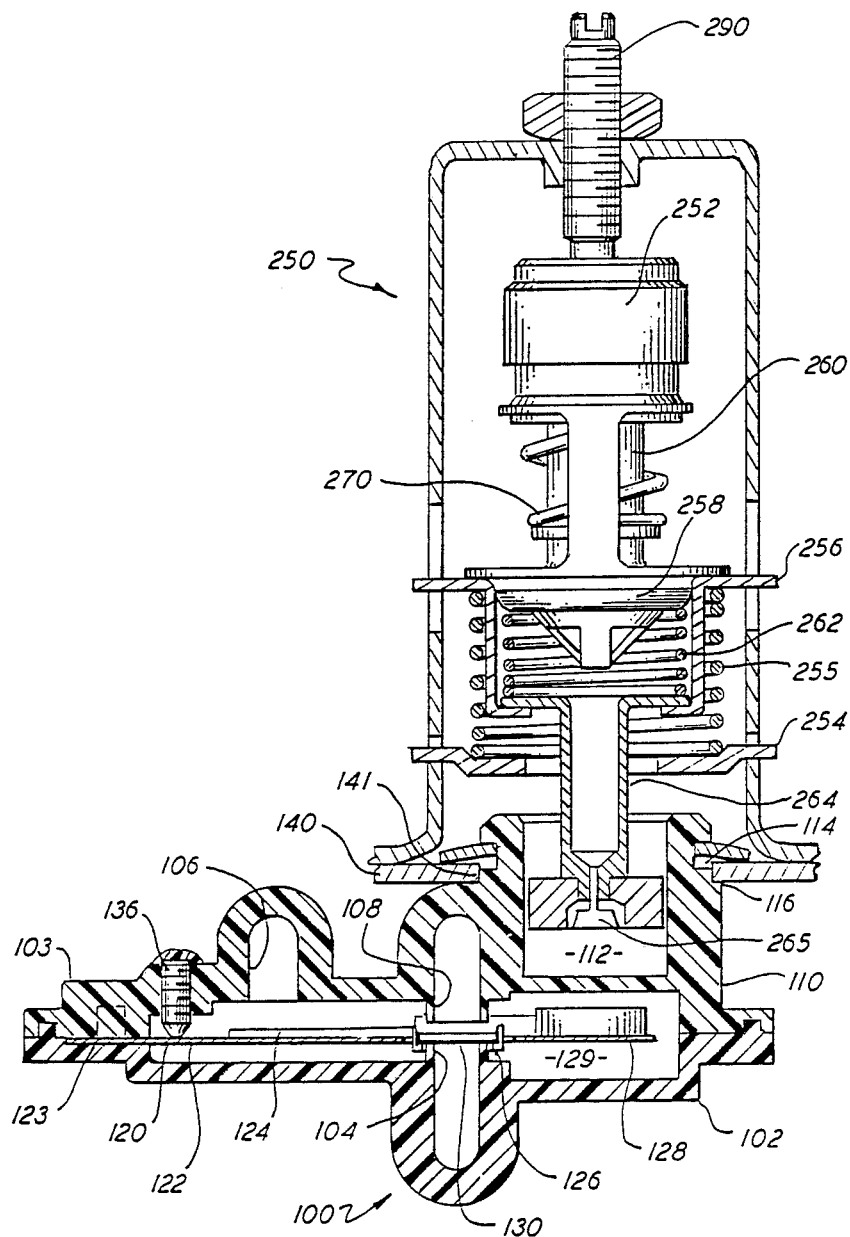
FIG. 5 is a sectional view of a second embodiment of the present invention corresponding to FIG. 4 and showing the valve element in a second, unactuated position.
Figure 7:
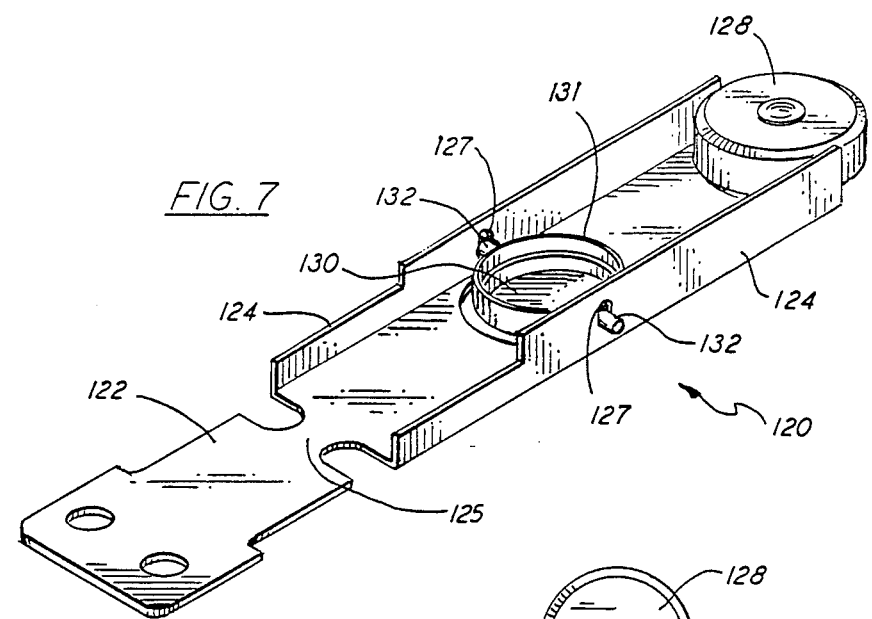
FIG. 7 is a pictorial view of the valve element.
Figure 8:
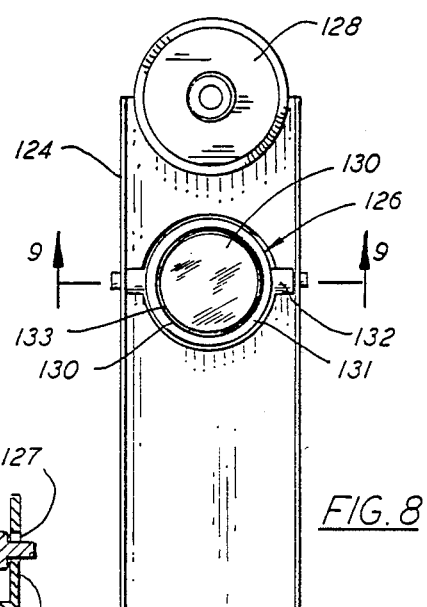
FIG. 8 is a top view of the valve element.
Figure 9:
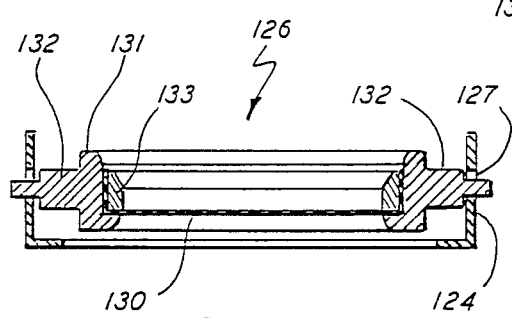
FIG. 9 is a sectional view taken along line 9—9 of FIG. 8.

In FIGS. 3 and 4, the numeral 100 generally designates the valve assembly or proximity switch and the numeral 150 generally designates the actuator. The valve assembly 100 includes mating casing parts 102 and 103 which are of a non-magnetic material, such as plastic, and are glued or otherwise suitably secured together in a fluid tight assembly. Casing part 102 defines a normally closed port 104 which is fluidly connected to outlet 105. Casing part 103 defines port 106 and normally open port 108 which are, respectively, fluidly connected to inlet 107 and outlet 109. Casing part 103 further defines an extension 110 which has a cylindrical chamber 112 formed therein as well as an annular groove 114 and shoulder 116 formed on the exterior of the extension 110. A valve element 120 includes a flexible or pivotable blade 122 having one end received in a complementary recess 123 formed in casing part 102 so as to permit the locating and securing of valve element 120 in the assembling of casing parts 102 and 103. Blade 122 has a stiffener in the form of a stepped turned up flange 124 as well as yoke assembly 126 and low reluctance ferro magnetic pad 128 secured thereto. As is best shown in FIGS. 7 and 8, blade 122 also has a necked down portion 125 which defines the point of flexure of blade 122. Yoke assembly 126 includes a polyurethane film disc 130 which alternatively seats on port 104 or port 108 in a valving action. Because the yoke assembly 126 moves through an arc in moving between the positions blocking either port 104 or port 108, it is necessary to have the film disc 130 become co-planar with the seating face of ports 104 and 108. To achieve this, yoke 131 is provided with stepped diametrically extending pivot rods 132 as is best shown in FIGS. 8 and 9. Stepped pivot rods 132 are rotatably or pivotably received in mounting holes 127 in stepped turned up flange 124. Film disc 130 is held in place in yoke 131 by ring 133 which is press fit into yoke 131 with film disc 130 therebetween. Yoke 131 is therefore able to pivot into a co-planar engagement with port 104 or 108 and is moved to the co-planar engagement due to the unbalanced torsional force on the yoke 131 when film disc 130 is not co-planar and engages only one side thereof when engaging port 104 or 108. In installing yoke assembly 126, one or both of the stepped turned up flanges 124 is bent towards flat a sufficient amount to permit yoke assembly 126 to be snapped into mounting holes 127 and the flange(s) returned to their original shape. Screw 136 is threadably secured in casing part 103 and engages blade 122 so as to provide a seating bias to cause film disc 130 to close port 104 as illustrated in FIG. 5 in an unactuated position of actuator 150 or 250. The necked down portion 125 of blade 122, as is best shown in FIGS. 7 and 8, defines the pivot for flexure of blade 122 since it provides the least resistance to flexure.

As best shown in FIG. 4, the valve assembly or proximity switch 100 is secured in place by inserting extension 110 into hole 141 in sheet metal member 140 such that shoulder 116 engages sheet metal member 140. Typically, sheet metal member 140 is a member which may be installed in the wall of a plenum. A C-clip 142 or other suitable attachment means is placed in groove 114 and engages the opposite side of sheet metal member 140 as that engaged by shoulder 116.

With valve assembly 100 secured in place in member 140, an actuator can then be attached to member 140. Referring to FIG. 4, actuator 150 includes a charged thermostatic bellows 152 which is preferably of copper and filled with gas. Magnetic actuator 164 is secured to bellows 152 and carries a magnetic member 165 which is reciprocated in chamber 112 by the expansion and contraction of bellows 152 due to changes in the temperature of the warm or cool air stream to which it is exposed. Magnetic member 165 acts as a proximity switch with respect to magnetic pad 128 in that magnetic member 165 is not exposed to the fluid within the chamber 129 but causes the movement of film disc 130 in a valving action by attracting magnetic pad 128 when in proximity thereto. In FIGS. 4 and 5 the structure of the valve assembly or proximity switch 100 is identical but FIG. 4 illustrates the position of valve element 120 due to the magnetic attraction between magnetic member 165 and magnetic pad 128 whereas FIG. 5 illustrates the unactuated position of valve element 120 due solely to the biasing effect of screw 136. The position of bellows 152 and therefore magnetic member 165 can be adjusted by screw 190.

In FIG. 5, the valve assembly 100 is the same as that illustrated in FIGS. 3 and 4, but actuator 150 has been replaced with a different thermal actuator 250. The thermal actuator 250 is specifically illustrated as a phase change element 252 where a solid phase material goes to a liquid phase in the temperature range of interest and with an increase in volume, but could be a bimetal. In the unactuated position illustrated, compression spring 255 seats against stop 254 and cap member 256. Cap member 256 provides a seat for the head 258 of plunger 260 and is biased in opposition to spring 255 by spring 262 which seats against magnetic actuator 264 and heat 258. Magnetic actuator 264 carries a magnetic member 265 which is reciprocated in chamber 112 by the actuator 250. The spring 262 serves as a lost motion device in that it absorbs overtravel of head 258 after magnetic actuator 264 has bottomed out in its movement within chamber 112. Spring 270 serves to return plunger 260 to the illustrated position when the output force is reduced in thermal element 252. The thermal element 252, located in the warm or cool air stream, senses the flowing air temperature and acts by changing phase, when appropriate. The position of thermal element 252 and therefore magnetic member 265 can be adjusted by screw 290.

Figure 6:
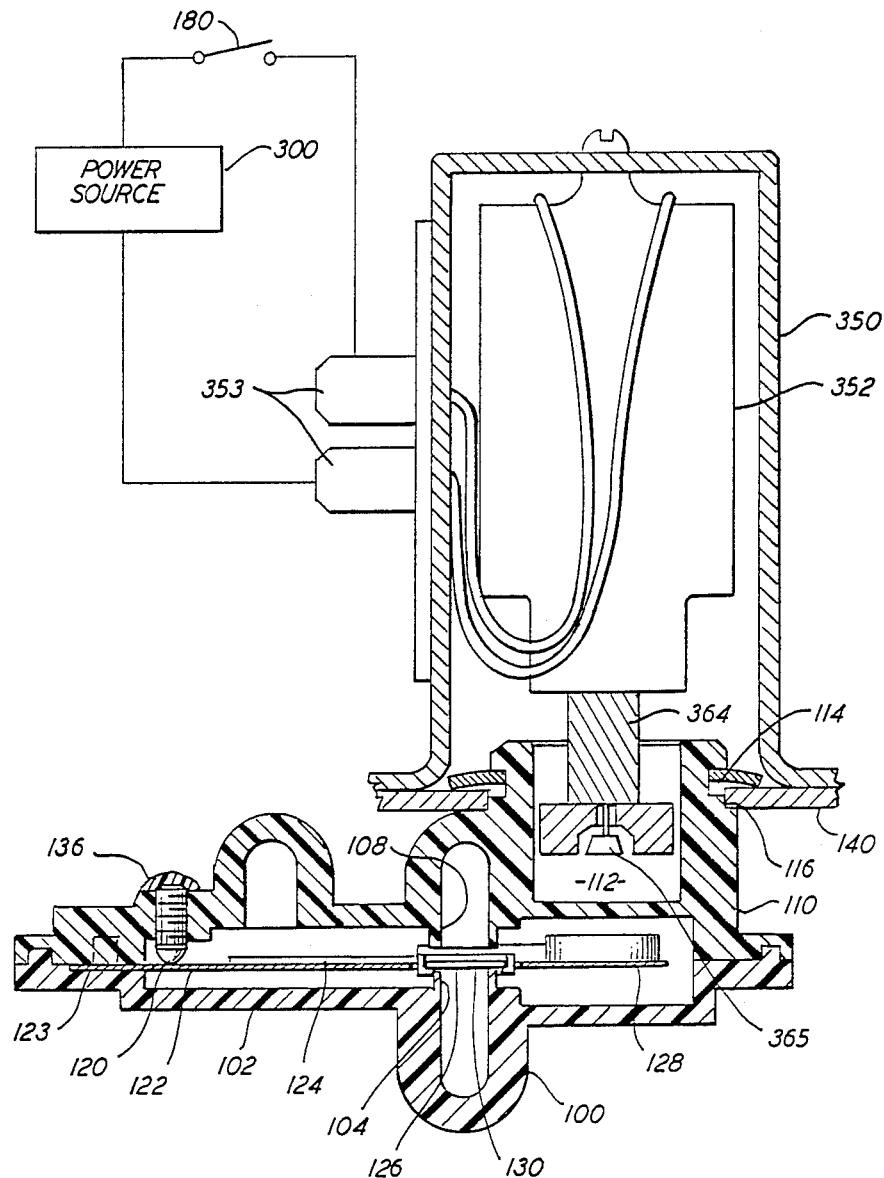
FIG. 6 is a sectional view of a third embodiment of the present invention showing the valve element in the second position but which is the solenoid actuated position.

Referring now to FIG. 6, the valve assembly or proximity switch 100 is the same as that of FIGS. 3-5 but actuator 350 includes an internal spring solenoid 352 for positioning valve element 120 in response to an electric signal. The magnetic actuator 364 which carries magnetic member 365 is attached to the shaft of the solenoid. Upon energizing of the solenoid 352, magnetic member 3564 is moved outwardly in chamber 112 causing outlet port 104 to close, as illustrated. When the power is removed from the solenoid 352 the internal spring (not illustrated) causes the magnetic actuator 364 to move magnetic member 365 further into chamber 112 to thereby attract magnetic pad 128 causing valve disc 130 to engage and close port 108 and to open port 104. Power to solenoid 352 through contacts 353 is provided upon the closing of switch 180 which can be a thermostatically responsive switch or a computer controlled switch. The power source 300 can be any suitable source of power and may be incorporated into a computer control.

As noted, the valve assembly 100 is identical in FIGS. 3-6. FIGS. 5 and 6 show valve element 120 in the same position closing port 104. However, FIG. 5 is a cold or an unactuated position of actuator 250 and FIG. 6 is an actuated position of actuator 350. The difference in designation is due to the fact that energy in the form of heat is necessary to expand/acutate the actuators 150 and 250 whereas electrical energy is necessary to contact/actuate actuator 350. FIG. 4 shows the valve element 120 in its actuated position closing port 108. In the case of actuator 350, the solenoid 352 is actuated in response to the completing of an electric circuit by the closing of a switch 180 which may be caused by a computer or the like or may be a thermally actuated switch exposed to the conditioned air which completes the power supply circuit upon closing. Actuators 150 an 250, however, are responsive to the temperature of their surroundings and would normally be exposed to the plenum air or the moving air stream.

Although preferred embodiments of the present invention have been illustrated and described, other changes will occur to those skilled in the art. It is, therefore, intended that the present invention is to be limited only by the scope of the appended claims.

What is claimed is:

1. A warm-up arrangement for a central air conditioning system supplying heated or cooled conditioned air comprising:

means for supplying conditioned air to a zone;

means for controlling the flow of said conditioned air into the zone;

bleed-type thermostatic means for sensing the temperature in the zone and regulating said means for controlling the flow responsive to the temperature in the zone so as to maintain a preset temperature when cool conditioned air is being supplied by controlling said means for controlling the flow of said conditioned air; and means for overriding said thermostatic means to permit the uncontrolled supplying of warm conditioned air into said zone wherein said means for overriding includes a valve comprising:

housing means defining a chamber and having an unvalved inlet fluidly connected to said bleed-type thermostat so as to provide a fluid bypass to said thermostat which is disabled thereby and an atmospheric outlet in fluid communication with said chamber;

valve element means including ferro-magnetic means and pivotably mounted in said chamber so as to be movable between a first position blocking said outlet and a second position opening said outlet;

biasing means for providing a bias normally positioning said valve element means in said first position; and actuator means including a magnetic member and means for moving said magnetic member into and out of proximity with said ferro-magnetic means whereby said valve element is caused to move against said bias of said biasing means to said second position due to magnetic attraction between said ferro-magnetic means and said magnetic member when in proximity to cause bypassing of said bleed-type thermostat and returns to said first position when out of proximity.

2. The warm-up arrangement of claim 1 wherein said actuator means includes thermostatically responsive means.

3. The warm-up arrangement of claim 1 wherein said actuator means includes a solenoid.

4. The warm-up arrangement of claim 3 wherein said actuator means further includes a thermostatically responsive switch.

5. The warm-up arrangement of claim 1 wherein said valve element means further includes defining means for locating a flexure point on said valve element means whereby pivoting of said valve element occurs by flexure at said flexure point.

6. The warm-up arrangement of claim 1 wherein said valve element means further includes a valve blade with a valve disc pivotably mounted thereon so as to be co-planar with said outlet when seated thereon.

* * * * *